W. P. MILLER.
Assignor, by mesne assignments, to R. HOE & Co.
Insertible Saw-Teeth.
No. 8,323. Reissued July 9, 1878.
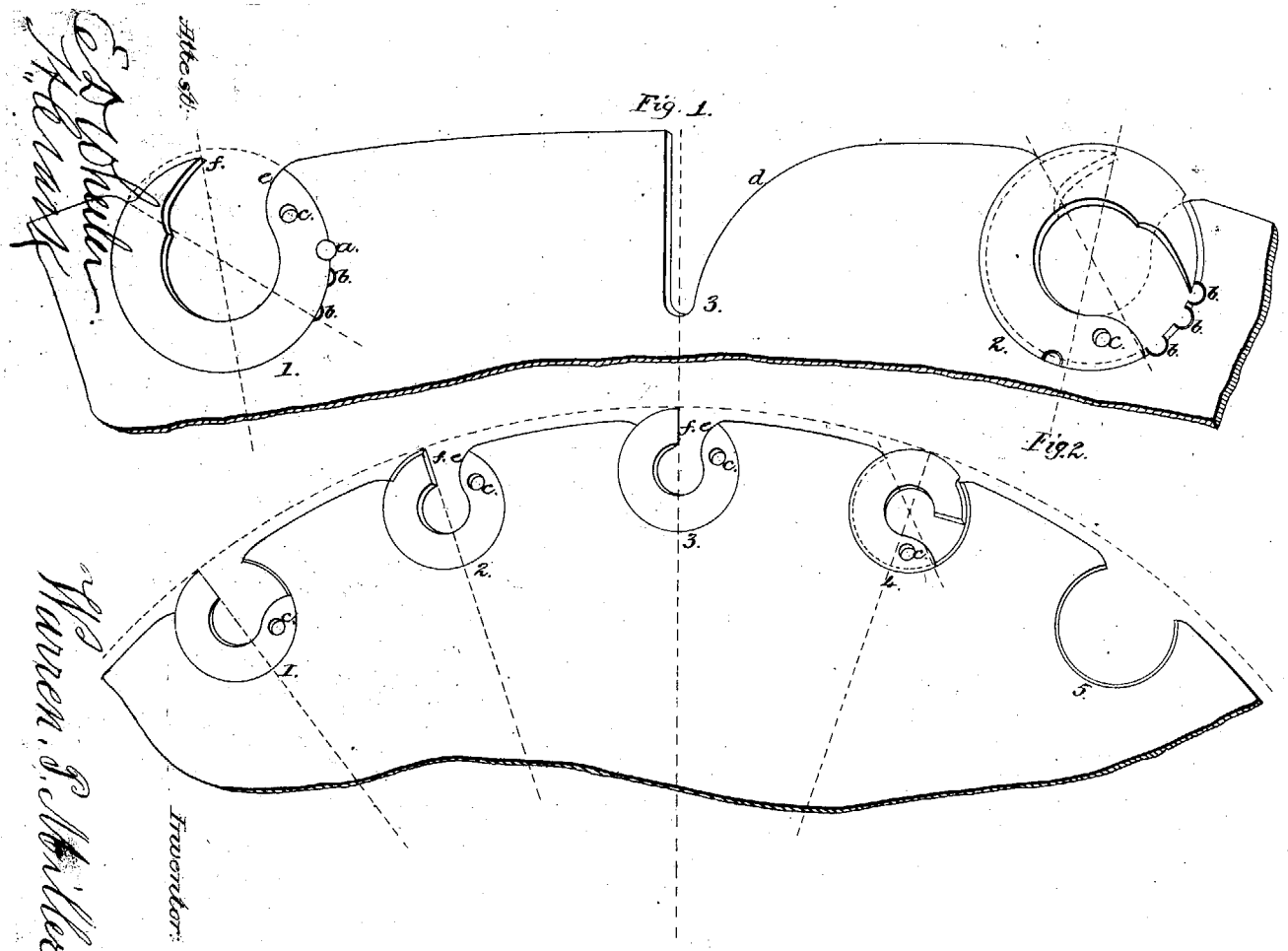

UNITED STATES PATENT OFFICE.

WARREN P. MILLER, OF BROOKLYN, NEW YORK, ASSIGNOR, BY MESNE ASSIGNMENTS, TO R. HOE & CO.

IMPROVEMENT IN INSERTIBLE SAW-TEETH.

Specification forming part of Letters Patent No. 58,664, dated October 9, 1866; Reissue No. 8,323, dated July 9, 1878; application filed June 24, 1878.

*To all whom it may concern:*

Be it known that I, WARREN P. MILLER, formerly of the city and county of San Francisco, and State of California, now of the city of Brooklyn, county of Kings, and State of New York, have invented a new and Improved Mode of Attaching Teeth to Saws; and I do hereby declare that the following is a full and exact description thereof, reference being had to the accompanying drawings, making a part of this specification.

The object of my invention is to have a saw-tooth of such form that it can be cheaply and perfectly made—a tooth that can be made in duplicate with perfect accuracy, that is strong, has plenty of room for the chip, and will not choke or clog with dust; and a cavity or seat in the saw-plate of a shape to fit said tooth, which latter is self-attaching and adjustable without the use of a forge.

My invention consists, first, in an insertible tooth for saws, when said tooth is constructed upon circular lines comprising more than one hundred and eighty degrees of a circle, and inserted into a cavity in the saw-plate of a shape to fit said tooth; second, a cavity or seat in a saw-plate for holding an insertible tooth, when constructed upon circular lines comprising more than one hundred and eighty degrees of a circle.

In the drawings, Design No. 1 is a segment of a saw for splitting, showing two teeth and their cavities or seats. Design No. 2 represents a segment of a saw with the teeth filed for cutting off.

Circular cavities or seats are formed in the saw-plate by means of a suitable cutter, forming a V in the inner edge, and at an angle of forty-five degrees, said seats or cavities being cut on circular lines comprising more than one hundred and eighty degrees of a circle, so as to retain the teeth inserted in the same.

Circular pieces of steel are prepared for the teeth a little larger than is required. When finished, they are pierced in the center, then placed on a mandrel and turned in a lathe, and a V-groove cut out. That part of the circle between the heel *e* and the point of the tooth *f* is cut away. They are then pierced at *c*, tempered, and are ready to insert in their cavities or seats in the saw-plate. The teeth are pierced at *c* for the purpose of inserting a pin, by which they may be turned in their seats.

In Design No. 1, Figure No. 1 represents a tooth set for work. Fig. No. 2 represents a tooth as being inserted into the cavity or seat prepared in the saw-plate. So much of the groove in the cutting end of the tooth as, when in position, projects beyond the cavity or seat in the saw-plate is cut away, allowing it to come within the V on the inner edge of the cavity or seat, as shown. A hole is cut in the edge of the tooth, which, when it coincides with one of a series of holes, *b b b*, made in the saw-plate, has inserted through it a rivet, *a*, to prevent the tooth from being forced back. The series of holes *b b b* are made in the saw-plate for the purpose of inserting rivets at different distances as the tooth is turned forward, as it becomes necessary from time to time as the point of the tooth is worn away.

Fig. No. 3 represents a slit cut in the periphery of the saw-plate centrally between the teeth, the front side being on a line with the radius, the opposite side being rounded off, as shown at *d*. The object of the above-described cavity is for the purpose of receiving and carrying forward any dust that may escape the preceding tooth.

In Design No. 2, Fig. No. 1 represents a tooth worn and filed away, so that it occupies but little more than half of the circle, and is not capable of being again adjusted.

Figs. Nos. 2 and 3 represent teeth set in the proper position for work, each filed from opposite sides. Fig. No. 5 shows a seat in the plate prepared for a tooth with a V-groove in its outer edge. Fig. No. 4 represents a tooth as being inserted in the cavity or seat prepared in the saw-plate.

What I claim as my invention, and desire to secure by Letters Patent, is—

1. An insertible tooth for saws, when said tooth is constructed upon circular lines comprising more than one hundred and eighty degrees of a circle, and inserted into a cavity or seat in the saw-plate of a shape to fit said tooth, substantially as specified.

2. A cavity or seat in a saw-plate for holding an insertible tooth, when constructed upon circular lines comprising more than one hundred and eighty degrees of a circle, substantially as specified.

In testimony whereof I have signed my name to this specification in the presence of two subscribing witnesses.

WARREN P. MILLER.

Witnesses:

H. T. MUNSON,

GEO. H. GRAHAM.